United States Patent
Shamma et al.

(10) Patent No.: US 9,710,454 B2
(45) Date of Patent: Jul. 18, 2017

(54) MEDIA EVENT STRUCTURE AND CONTEXT IDENTIFICATION USING SHORT MESSAGES

(71) Applicant: EXCALIBUR IP, LLC, Sunnyvale, CA (US)

(72) Inventors: David Ayman Shamma, San Francisco, CA (US); Lyndon Kennedy, San Francisco, CA (US); Elizabeth F. Churchill, San Francisco, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 27 days.

(21) Appl. No.: 14/725,574

(22) Filed: May 29, 2015

(65) Prior Publication Data
US 2015/0339289 A1    Nov. 26, 2015

Related U.S. Application Data

(63) Continuation of application No. 12/710,126, filed on Feb. 22, 2010, now Pat. No. 9,084,096.

(51) Int. Cl.
| | | |
|---|---|---|
| *G06F 17/30* | (2006.01) | |
| *G06F 17/27* | (2006.01) | |
| *H04L 12/58* | (2006.01) | |
| *H04W 4/14* | (2009.01) | |
| *H04L 29/08* | (2006.01) | |
| *H04W 4/20* | (2009.01) | |

(52) U.S. Cl.
CPC ........ *G06F 17/2765* (2013.01); *H04L 12/588* (2013.01); *H04L 51/32* (2013.01); *H04L 67/22* (2013.01); *H04W 4/14* (2013.01); *H04W 4/20* (2013.01)

(58) Field of Classification Search
CPC ........ G06F 17/30029; G06F 17/30253; G06F 17/30752; G06F 17/21; G06F 17/2765; G06F 17/30038; G06F 17/30056; G06F 17/30058; G06F 17/30265; G06F 17/30268; G06F 17/30781; G06F 17/30784; G06F 17/3079
USPC ............................. 707/E17.028, E17.02, 796
See application file for complete search history.

(56) References Cited

U.S. PATENT DOCUMENTS

| | | | |
|---|---|---|---|
| 7,890,488 B2 * | 2/2011 | Baeza-Yates | G06F 17/3089 707/706 |
| 7,996,432 B2 * | 8/2011 | Coffman | G06F 17/30038 707/796 |
| 8,250,616 B2 * | 8/2012 | Davis | H04N 7/17318 725/87 |
| 8,645,997 B2 * | 2/2014 | Roberts | H04N 7/173 725/114 |

(Continued)

*Primary Examiner* — Debbie Le
(74) *Attorney, Agent, or Firm* — James J. DeCarlo; Greenberg Traurig

(57) ABSTRACT

The present disclosure is descriptive of discovering structure, content, and context of a media event, e.g., a live media event, using real-time discussions that unfold through short messaging services. Generally, a sampling of short messages of a plurality of users is obtained. The sampling of short messages corresponds to a media event. A segment in the media event is identified using the sampling of short messages, and at least one term taken from the sampling of short messages is identified. The at least one term is indicative of a context of the identified segment.

20 Claims, 7 Drawing Sheets

(56) References Cited

U.S. PATENT DOCUMENTS

| | | | |
|---|---|---|---|
| 9,084,096 B2* | 7/2015 | Shamma | H04L 12/588 |
| 9,129,008 B1* | 9/2015 | Kuznetsov | G06F 17/30616 |
| 9,224,390 B2* | 12/2015 | Alkov | G06F 17/30873 |
| 2005/0252362 A1* | 11/2005 | McHale | G10H 1/368 |
| | | | 84/616 |
| 2006/0179454 A1* | 8/2006 | Shusman | G06Q 30/02 |
| | | | 725/45 |
| 2008/0014911 A1* | 1/2008 | Medved | H04M 7/0024 |
| | | | 455/414.2 |
| 2008/0147646 A1* | 6/2008 | Jaschek | H04L 29/06027 |
| 2009/0172150 A1* | 7/2009 | Alkov | G06F 17/30873 |
| | | | 709/224 |
| 2009/0216805 A1* | 8/2009 | Coffman | G06F 17/30038 |
| 2009/0235298 A1* | 9/2009 | Carlberg | H04N 5/44543 |
| | | | 725/24 |
| 2010/0093455 A1* | 4/2010 | Chang | A63D 15/08 |
| | | | 473/44 |
| 2010/0138772 A1* | 6/2010 | Garcia | G06F 17/3089 |
| | | | 715/774 |
| 2010/0162312 A1* | 6/2010 | Heilbron | G06F 17/30905 |
| | | | 725/43 |
| 2011/0040760 A1* | 2/2011 | Fleischman | G06Q 30/02 |
| | | | 707/737 |
| 2011/0058101 A1* | 3/2011 | Earley | H04L 12/1822 |
| | | | 348/461 |
| 2011/0154223 A1* | 6/2011 | Whitnah | G06Q 10/10 |
| | | | 715/753 |

\* cited by examiner

MEDIA EVENT STRUCTURE AND CONTEXT IDENTIFICATION USING SHORT MESSAGES

CROSS REFERENCE TO RELATED APPLICATIONS

This application is a continuation of and claims priority from U.S. patent application Ser. No. 12/710,126, filed Feb. 22, 2010, entitled MEDIA EVENT STRUCTURE AND CONTEXT IDENTIFICATION USING SHORT MESSAGES, which is hereby incorporated by reference.

FIELD OF THE DISCLOSURE

The present disclosure relates to identification of structure and/or context of a media event, e.g., a live media event, and more particularly to identifying the structure and/or context of a media event using short message content.

BACKGROUND

Content, e.g., multimedia, audio, video, image, animation, interactive, etc. content, has increasingly become more accessible to users. In addition, the amount of video that is accessible has increased. By way of a non-limiting example, the amount of video content that is accessible by a user via the internet, or other computer network, has increased. One type of multimedia content is a media event, such as a live media event.

Content, such as content memorializing a media event, can be quite lengthy. A user may only be interested in a portion of the event. Alternatively, a user may not know whether the user is interested in the content.

SUMMARY

The present disclosure seeks to address failings in the art and to provide a system, method and architecture of media event segment identification and annotation using short message sampling. Embodiments of the present disclosure discover structure, content, and context of a media event, e.g., a live media event, using real-time discussions that unfold through short messaging services.

In accordance with one or more embodiments, a method is provided, which comprises obtaining, using at least one computing device, a sampling of short messages of a plurality of users, the sampling of short messages corresponding to a media event; identifying, using the at least one computing device and the sampling of short messages, a segment in the media event; and identifying, using the at least one computing device, at least one term taken from the sampling of short messages, the at least one term indicative of a context of the identified segment.

In accordance with one or more embodiments, a system is provided that comprises at least one computing device configured to obtain a sampling of short messages of a plurality of users, the sampling of short messages corresponding to a media event; identify, using the sampling of short messages, a segment in the media event; and identify at least one term taken from the sampling of short messages, the at least one term indicative of a context of the identified segment.

In accordance with one or more embodiments, a computer-readable storage medium that stores computer-executable process steps is provided. The process steps comprising obtaining a sampling of short messages of a plurality of users, the sampling of short messages corresponding to a media event; identifying, using the sampling of short messages, a segment in the media event; and identifying at least one term taken from the sampling of short messages, the at least one term indicative of a context of the identified segment.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview of a process flow in accordance with one or more embodiments of the present disclosure.

FIG. 2 provides an overview that includes components used in accordance with one or more embodiments of the present disclosure.

FIG. 3 shows a maximum follower count by minute from the subset of short messages related to Barack Obama's 2009 presidential inauguration as determined in accordance with one or more embodiments of the present disclosure.

FIG. 4 provides an example of normalized term frequency scores over time for terms identified as having the highest peakiness scores in short messages corresponding to the presidential inauguration proceedings in accordance with one or more embodiments of the present disclosure.

FIG. 5 provides an example of two terms with the highest level of sustained interest: "flubbed" and "messed" determined using the presidential inauguration short messages in accordance with one or more embodiments.

DETAILED DESCRIPTION

Figure 1:
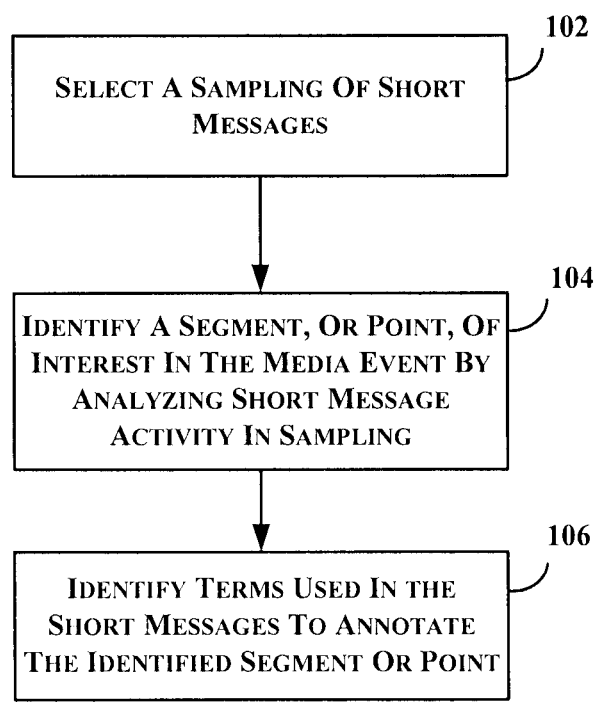

In general, the present disclosure includes a system, method and architecture of media event segment identification and annotation using short message sampling.

Certain embodiments of the present disclosure will now be discussed with reference to the aforementioned figures, wherein like reference numerals refer to like components. While embodiments of the present disclosure are described in connection with short messages generated using Twitter™, it should be apparent that any other type of short messaging or microblogging system, application, and/or short message type, is/are applicable. By way of a non-limiting example, a short message is a brief, e.g., 140 character, text, and/or media content, transmission from a user, e.g., person or entity, to one or more other users. Using Twitter™, a user posts the short message, which is displayed on the user's profile page and is delivered to other users, or followers, that subscribe to the user's short messages. Other short messaging applications include, without limitation, short messaging service applications, text messaging applications, multimedia messaging applications, internet chat applications, blogging and/or microblogging applications, electronic mail, etc.

In accordance with one or more embodiments, a collection of short messages are sampled and the sampled messages can be used to identify one or more portions, or segments, of a media event, and/or provide annotation, or description for, the media event, or segment of the media event. By way of a non-limiting example, the media event is a live media event, and the short message collection comprises short messages collected during the live media event. The collection of short messages is sampled, and the sampling of short messages is used to segment and annotate the media event. By way of some non-limiting examples, short message activity, such as the short message activity on Twitter, is analyzed to discover and annotate one or more portions or segments, e.g., points of interest, and topics associated with one or more portions or segments of a media event can be identified from the content of the short messages analyzed. By way of a further non-limiting example, the live media event can be stored, e.g., as analog, digital, video, audio and/or multimedia data or content, and the result of the analysis of the short message activity can annotate the media event or a portion of the media event identified from the analysis.

FIG. 1 provides an overview of a process flow in accordance with one or more embodiments of the present disclosure. At step 102, at least one criterion is used to sample, select, or identify, short messages from a collection of short messages. In accordance with one or more embodiments, the collection of short messages comprises short message activity collected for a media event, such as a live media event. As discussed herein the short messages can be collected during a broadcast of media event. By way of some non-limiting examples, accordance with one or more embodiments, short messages from users identified as having at least a threshold audience level can be selected, and/or short messages identified as being conversational-type messages can be selected. At step 104, the sampling of short messages, e.g., the short messages selected from a collection of short messages using one or more criterion, are analyzed to identify a transition of some kind, e.g., a new segment, a point of interest, etc., during the media event. At step 110, the short message sampling is analyzed to identify topical content to be associated with the media event, or a segment or point of interest of the media event.

In accordance with one or more embodiments, a process such as that described in FIG. 1 is embodied in hardware, software or a combination of hardware and software. In accordance with one or more embodiments, one or more general purpose computers, e.g., a personal computer or server computer, can be configured to perform one or more of the processes described herein.

Figure 2:
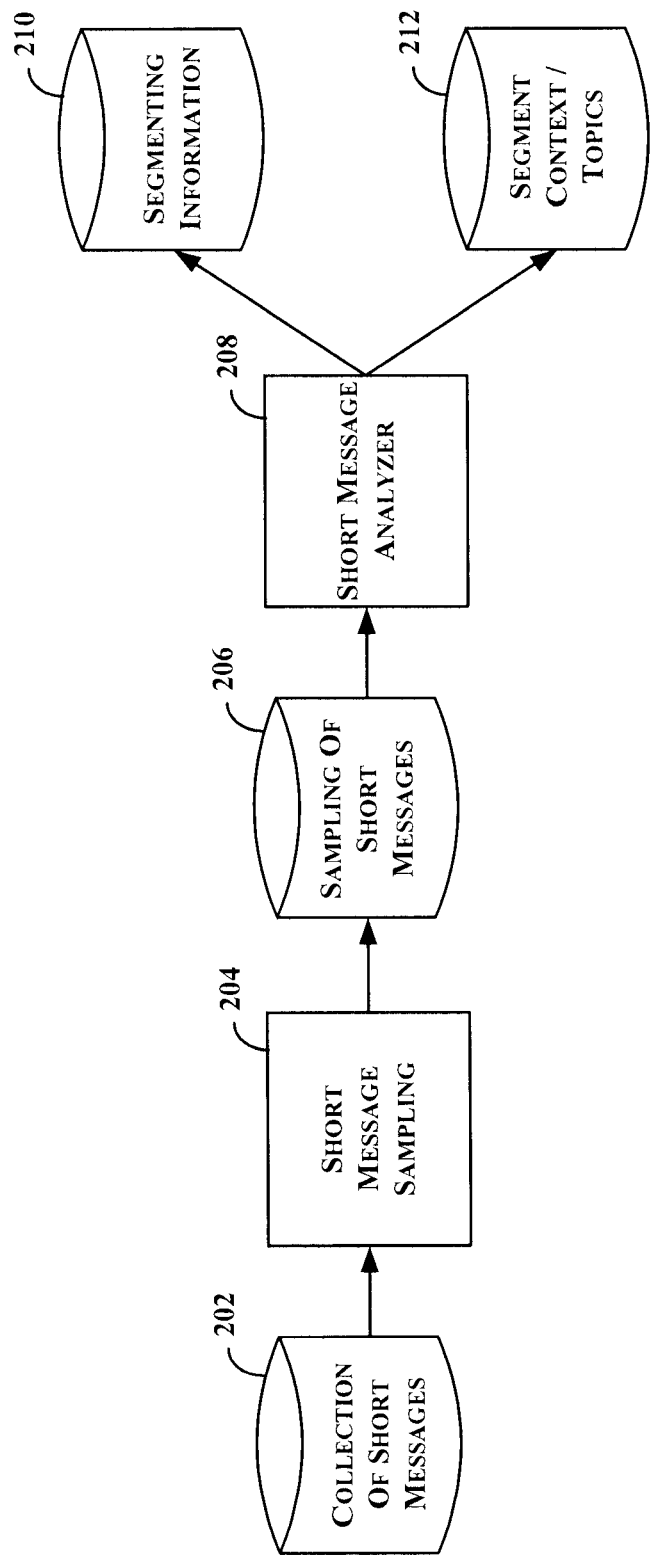

FIG. 2 provides an overview that includes components used in accordance with one or more embodiments of the present disclosure. A collection of short messages 202 is input to a short message sampling component 204. The collection of short messages 202 correspond to a media event. By way of a non-limiting example, the collection 202 can comprise short messages that have a time stamp, e.g., a time of posting of the message, which corresponds to the media event. The time stamp can be during the time that the media event, e.g., during the broadcast of the media event, for example. As another non-limiting example, the time stamp can be within a span that includes some time before and/or some time after the media event. As yet another non-limiting example, a pre-analysis can be performed on the short messages to identify terms used in the short messages related to the media event. It should be apparent that these and other techniques could be used to identify a collection 202 of short messages.

Short message sampling 204 samples the collection of short messages 202 to select a sampling of short messages 206. In accordance with one or more embodiments, the short message sampling component 204 can use one or more criterion to select short messages from the collection 202 to generate the sampling 206. By way of some non-limiting examples, the short message sampling component 204 can identify a number of followcasters, or users with subscribers. The number of followcasters can be determined based on a threshold number of subscribers, such that the followcasters that are selected have at least the threshold number of subscribers. The threshold that is used can be identified based on the users in the collection 202, a determination of the number of each user's subscribers, and a statistical analysis of the users' subscriber numbers determined using the collection 202. By way of a non-limiting example, the threshold can be identified from a distribution of the users' subscriber numbers, with the threshold corresponding to the third quartile, e.g., the selected user(s) have a number of subscribers that is at least in the $75^{th}$ percentile. The analysis can be performed across the whole span of the collection 202, or using a window with a time span that is less than the whole span of the collection 202.

In accordance with one or more embodiments, short message sampling 204 can analyze the collection 202 of short messages to identify conversational-type messages, which are selected for the sampling 206. Typically, a conversational-type message is one that is longer in length, and/or is directed to a specific user, or users. In Twitter™, a short message can contain an @username, which directs the short message to username, and provides a link between users, e.g., the message sender and the one or more @usernames. It should be apparent that other criterion can be used to identify a conversational-type message.

Short message analyzer 208 analyzes the sampling 206 of short messages to identify breaks in a media event, which are used to identify segments of the media event. In addition, analyzer 208 identifies terms used in the short messages of sampling 206 to identify topics and/or context of the media event as a whole, and/or the identified segments of the media event.

In accordance with one or more embodiments, segmenting information 210 and 212 can be used to summarize, or otherwise describe, the media event, or a segment of the media event; index, rank and retrieve the media event, or segment for searching; catalog the media event, etc.

Referring again to FIG. 1, in accordance with one or more embodiments, a short message collection can be sampled using a determined audience level of users that sent short messages, e.g., users that sent the short messages included in the collection. In accordance with one or more such embodiments, users that have an audience of users that is considered to be significant, e.g., relative to the audience levels of the other users in the collection, are identified and the short message activity of the identified users, referred to herein as followcasters, are selected for inclusion in a sampling of short messages used in steps 104 and 106 of FIG. 1. Embodiments of the present disclosure evaluate a user, or followcaster, identified by the collection of short messages to identify one or more followcasters, based on the number of the followcaster's followers, and the short message collection is sampled by selecting the messages sent by the identified followcaster(s). In accordance with one or more embodiments, the short message activity from the users identified as followcasters is used to identify the onset of a new segment or important event of interest in the media event. In accordance with one or more embodiments, an onset of a new segment of a media event, and/or the onset of an important event of interest, is identified from the activity of the user(s) identified as having a significant audience.

By way of a non-limiting example, Twitter™ users can choose to subscribe to, or "follow", a followcaster's messages, e.g., a followcaster's followers subscribe to, or request, that messages from the followcaster be sent to the followcaster. Each user has a follower count representing the number of users explicitly listening to the user's feed. Initially, e.g., when a new user signs ups or registers, the new user's follower count is zero. The number of users that subscribe to the followcaster is determined for each user in the collection. By way of a non-limiting example, the number of followers for a given user can be determined by identifying the number of users that receive short messages from the user. The number of followers a user has can describe the role of the user, e.g., a person, organization or other entity in the short message activity, e.g., a reporter or news agency, web celebrity, commentator, etc.

The follower count, or the number of users that follow a given user, can be part of a dataset of postings, or the count can be determined from the collection of short messages. A follower count determined for each user, or a subset of the users, can be used to identify an average follower count and a median follower count. By analyzing the determined follower counts, alone or with the average and/or median follower counts, one or more users having at least a threshold number of followers can be identified as having a significant audience.

In accordance with one or more embodiments, the follower count can be estimated by examining the follower count for a given interval of time. By way of a non-limiting example, the interval of time is one minute; however, any other time interval can be used. An aggregate number of short messages, e.g., an aggregate number of Twitter users' tweets, is determined for each interval of time, e.g., for each minute. In accordance with one or more embodiments, the short messages that are aggregated can be a subset of the collection of short messages, e.g., the subset of short messages related to a given media event, such that a short message is identified as part of the subset based on the presence of one or more keyword terms identified for the media event in the short message. A sum, mean, media and maximum number of followers are determined for each time interval's users. A maximum follower count by time interval can be analyzed to identify dominate followcasters, e.g., followcasters considered to be announcing an onset of a segment or point of interest in the media event.

Figure 3:
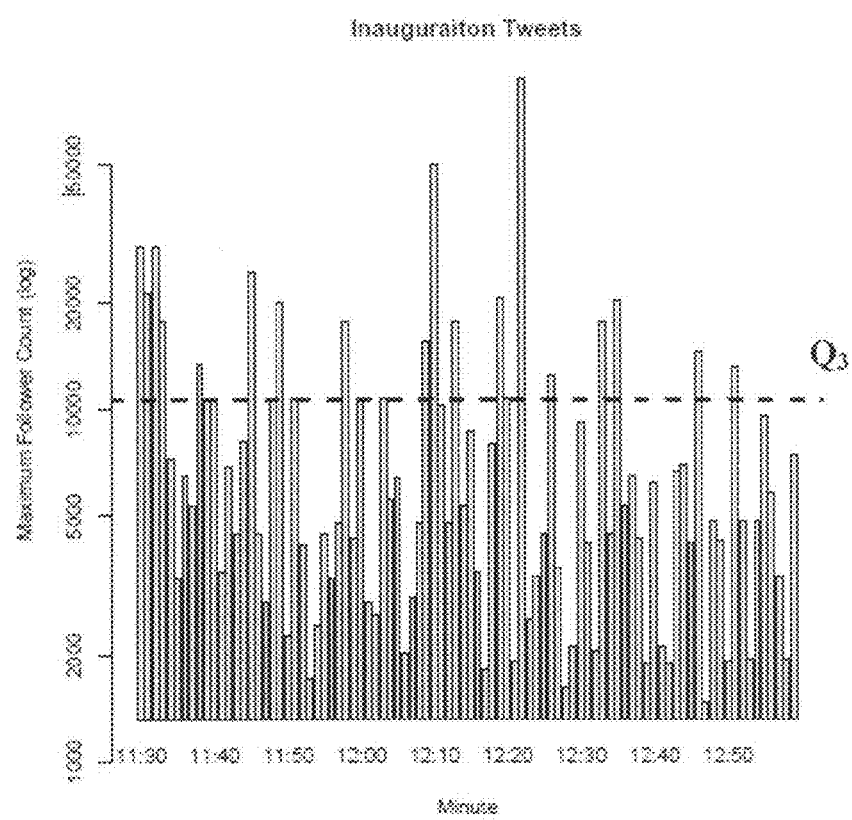

In one or more embodiments, the follower counts can be analyzed in a localized window, e.g., a window comprising one or more time intervals, e.g., such as when the follower counts are as a whole volatile. FIG. 3 shows a maximum follower count by minute from the subset of short messages related to Barack Obama's 2009 presidential inauguration as determined in accordance with one or more embodiments of the present disclosure. In the example, the follower counts at large are volatile; volatile follower counts can be measured in a localized window. There are thirteen users in the upper quartile tail; one user's follower count dropped by one only to increase by two followers within the 90-minute sample window. In the upper quartile tail, nineteen tweets came from 13 users. Of these users, only two users were the outliers in the upper quartile tail of the overall distribution (e.g., greater than quartile three, or $Q_3$); one user was a prominent blogger in the San Francisco Bay Area that had 49,485 followers and the other was CNN Breaking News that had 86,631 followers. Both had at least one posting relaying a quote from another source, e.g., quoting a news director or Barack Obama. The number of followers a user has can describe the role of the user, e.g., a person, organization or other entity in the short message activity, e.g., a reporter or news agency, web celebrity, commentator, etc. The top 10 users by follower count were mainstream media companies and popular bloggers.

In accordance with one or more embodiments, the level of conversational-type short message activity, e.g., number of short messages that mention another user, can be used segmenting a media event. This analysis can be used instead of or in addition to short message sampling of followcasters as a mechanism for identifying segments of the media event. Variations in the level of conversation, which can be determined from the level of conversational-type short messages, can reflect levels of interest in the media event itself, which can be used to identify a break in the media event. By way of a non-limiting example, a conversational-type short message comprises a message that mentions another user, e.g., in Twitter™, a conversational-type short message, or tweet, is identified as one that includes an "@mention" of another user. By way of another non-limiting example, the conversational-type message contains an indication that the message is directed to one or more other users.

In accordance with one or more embodiments, fluctuations in conversational-type messages during the course of the media event can be used to identify breaks in the media event, which can be used to identify segments of the media event. With an assumption that users post less conversational short message content at significant points, or segments, in a media event and post more conversation content at the end of a segment, periodic swells in volume can be identified and used to identify logical breaks in the event. An identified break can be a candidate segmentation point. In accordance with one or more such embodiments, moments of low conversational message activity are mapped to a segment onset, e.g., points of event onset, during a media event, and moments of high conversation are mapped to a segment's ending.

Since the number of messages per minute in a linear-rate data feed can be virtually constant and not periodic, examining overall volume of short messages per minute may not work. The volume of directed conversations, e.g., "@ mentions" in tweets, can vary over time. Additionally, there is a strong correlation between the number of characters typed per minute and the number of @ mentions per minute. In view of this correlation, the number of @ mentions can be used as an indicator of the conversational level at a given time, such that a fluctuation in the number of @ mentions is considered a fluctuation in the conversational level of the short messages. In accordance with one or more embodiments, conversational fluctuations are identified by counting the number of @ mention messages per time interval, e.g., per minute. A drop in conversational messages, which corresponds with a drop in the number of @ mention messages, signifies the onset of a segment, e.g., the beginning of the media event, an important point during the media event, etc. A rise in conversational messages, which corresponds with a rise in the number of @ mention messages, signifies the end of a segment, e.g., the end of the media event, the end of an important point in the media event, etc.

In accordance with one or more embodiments, a term used in the short message activity can be identified and used to identify a topic, context and/or description for the media event, or a segment of the media event. Evolution of usage of terms over time can reflect the content of the media event around moments of interest. In accordance with one or more embodiments, textual content of short messages can indicate the structure and content of the media event, and/or the relative level of interest that individual moments in the media event generate.

By way of a non-limiting example, the temporal evolution of the textual content of short messages can point towards and semantically annotate important moments and predict topics of on-going discussion and interest. In accordance with one or more embodiments, the frequency of a term is examined over time. A scoring measure that is based on term frequency and inverse document frequency, tf-idf, is used. A term, i, is scored according to its window term frequency, $tf_{t,i}$, or the number of short messages containing term i within a given temporal window around time t. The window term frequency, $tf_{t,i}$ can be normalized by a corpus term frequency, $cf_i$, which is a total number of short messages containing term i across the collection, or alternatively the sampling, of short messages. By way of a non-limiting example, a normalized term frequency score for term i around time t can be expressed as:

$$ntf_{t,i} = \frac{tf_{t,i}}{cf_i},$$

which can be described as the percentage of the total short messages containing term i that occur within the window around time t. By way of one non-limiting example, the size of the sliding window is 5 minutes (2.5 minutes before or after t). A normalized term frequency score can be calculated for each minute covered by the collection of short messages, for example.

In accordance with one or more embodiments, a term associated with a portion of interest, e.g., a segment, moment, etc., in the media event comprises a term that has a high frequency in the temporal vicinity of moment of interest and be infrequent, e.g., have a lower frequency, relatively, at other times. Such a term can be used to identify a localized topic. In accordance with one or more embodiments, to identify a moment of interest, each term, i, in the short message collection, or subset thereof, is ranked according to its peakiness score, which is the maximum value of $ntf_{t,i}$ for term i. Intuitively, the maximum peakiness score for a term is 1, which is indicative of all occurrences of the term falling within one window. A non-peaky term has a uniform normalized term frequency score across all windows, which is indicative of a frequency of usage that is invariant over time. If term i reaches a significant peak, its "peakiest", at time t, it is indicative of a moment of interest at time t and that the term i is a reflection of the content of that moment.

A single event can have multiple terms associated with it. By way of one example, "aretha," "franklin," "bow," and "sings" are four of the top-six overall peakiest terms, but each is reflecting the same event: Aretha Franklin's performance at the presidential inauguration and the bow on her hat. Duplicate event labels can be removed by skipping terms that are highly correlated (p<0.05), and replacing them with a higher-ranked term.

Figure 4:
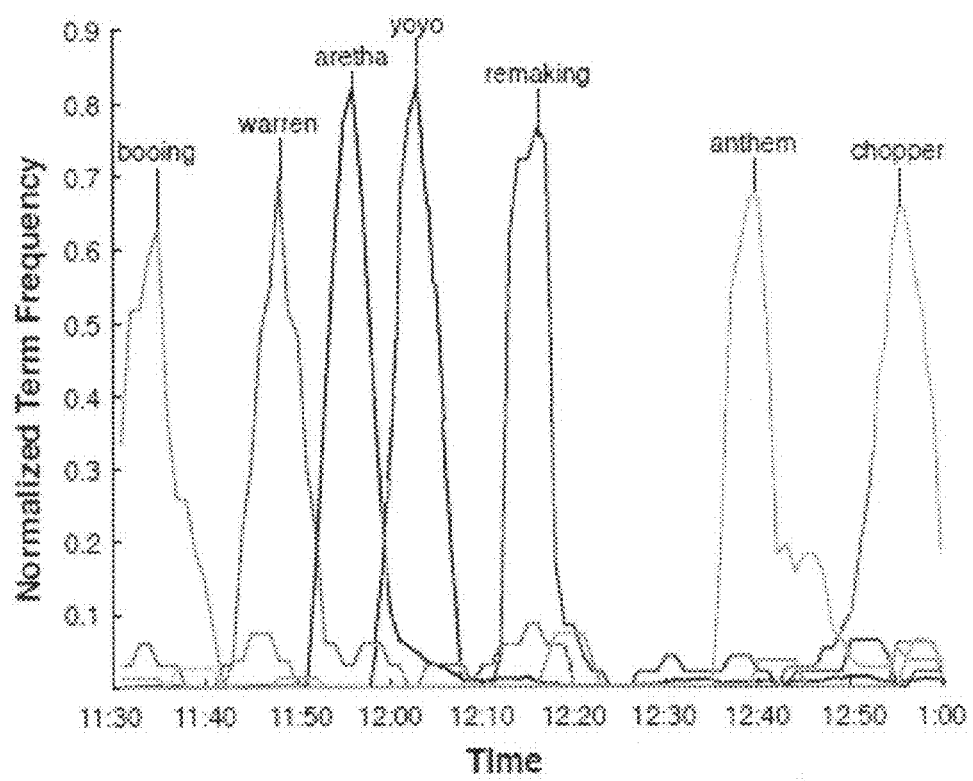

FIG. 4 provides an example of normalized term frequency scores over time for terms identified as having the highest peakiness scores in short messages corresponding to the presidential inauguration proceedings in accordance with one or more embodiments of the present disclosure. Each of these terms distinctly reflects actual events in the inauguration proceedings. The terms "aretha," "yoyo," and "warren" reflect the appearances of Aretha Franklin, Yo-Yo Ma, and Rick Warren, respectively. The appearance of "booing" corresponds to the appearance of George W. Bush and a peak in "chopper" occurs when he departs via helicopter. "Remaking" is the highest-ranked of a cluster of terms that echo the content of Obama's address and "anthem" peaks as the national anthem is played.

In accordance with one or more embodiments, sustained conversational terms can be identified. In accordance with one or more embodiments, a sustained level of interest in some portion of the media event is reflected in the temporal evolution in usages of a term, or terms, in a collection of short messages, e.g., from Twitter or other short messaging or microblogging system, or application. A sustained level of interest is identified by, a time, $t_{peak,i}$, at which a peak in the normalized term frequency score occurs for a term i is determined. A sustained-interest term will be seldom used before $t_{peak,i}$ and then more frequently used after $t_{peak,i}$. To evaluate this for a term, the average values of $ntf_{t,i}$ for $t<t_{peak,i}$ (pre-peak) and $t>t_{peak,i}$ (post-peak) are determined for the term. A term's sustained interest score is determined using the ratio of the average post-peak score over the average pre-peak score. All of the terms with sustained interest scores are ranked according to their individual sustained interest scores.

Figure 5:
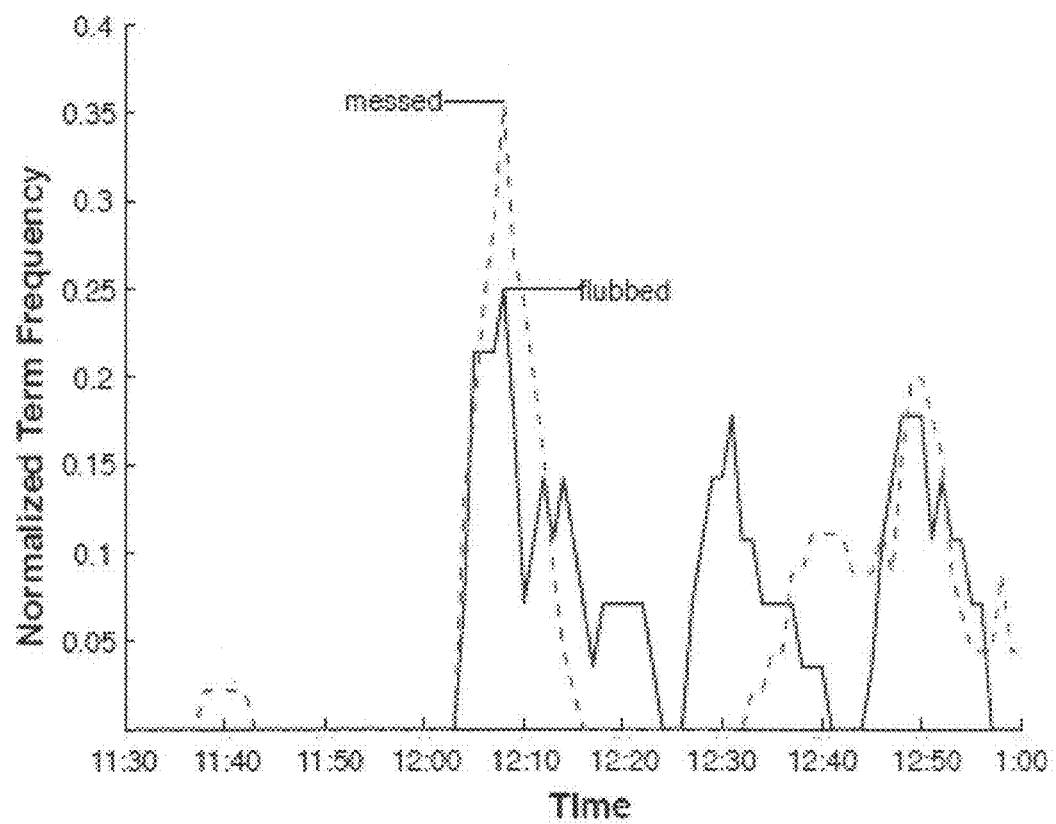

FIG. 5 provides an example of two terms with the highest level of sustained interest: "flubbed" and "messed" determined using the presidential inauguration short messages in accordance with one or more embodiments. Both are related to Chief Justice Roberts mistakenly switching the order of a few words while administering the oath of office to President Obama. Both terms are virtually never used before the oath incident and then suddenly peak around the event. However, unlike the peaky terms shown in FIG. 4, the terms "flubbed" and "messed" continue to be used for a great deal of time after the event. This particular event received a great deal of media attention in the days following the inauguration, which is predictable from the sustained interest identified by analyzing the short messages.

The usage of @mentions in tweets containing the two terms "flubbed" and "messed" also evolves over time. If the tweets containing "flubbed" or "messed" are separated into two groups, i.e., those around the time of the oath (before 12:15) and those after the oath (after 12:15), there is a distinct difference in the type and level of conversation. The initial set of tweets around the time of the oath simply note and react to the mistake. Meanwhile those that follow in the ensuing hour afterwards are further conversations about the incident and contain instances of people discussing the oath and correcting each other. Only 7% of the tweets in the first set contain @mentions, compared to 47% in the second set.

Figure 6:
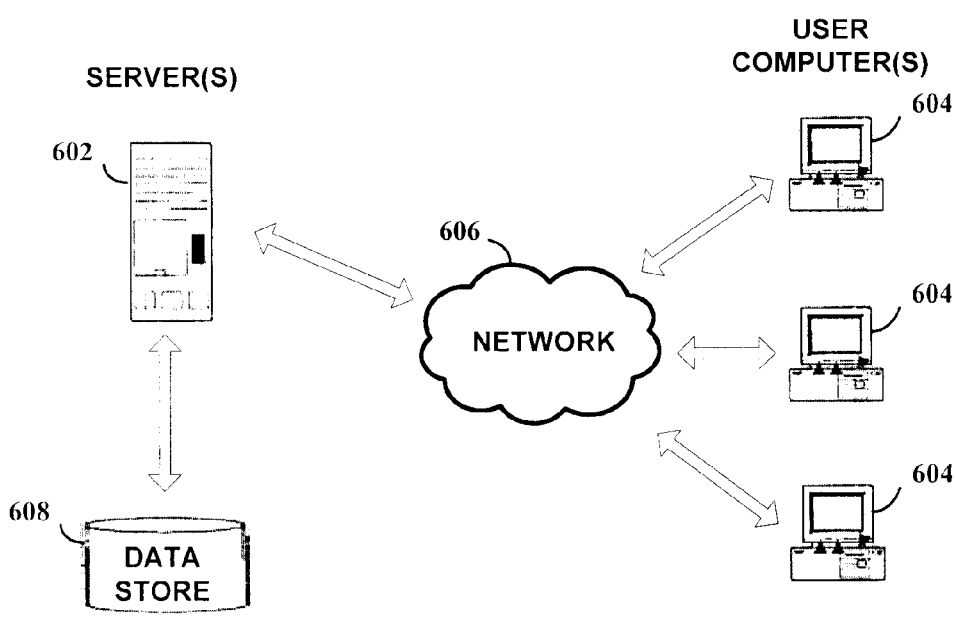
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more servers, user devices or other computing device, 602 are configured to comprise functionality described herein. For example, a computing device 602 can be configured to collect short messages from users of computer 604 and/or to analyze a short message collection in accordance with one or more embodiments of the present disclosure.

Computing device 602 can serve content, e.g., short messages such as tweets, to user computers 604 using a browser, or other, application via a network 606. Data store 608 store a collection, and/or sampling, of short messages, program code to configure a server 1202 to execute code and/or perform methods in accordance with one or more embodiments of the present disclosure. The user computer 604 can be any computing device, including without limitation a personal computer, personal digital assistant (PDA), wireless device, cell phone, internet appliance, media player, home theater system, and media center, or the like.

For the purposes of this disclosure, a computing device includes a processor for executing, and memory for storing, program code, data and/or software. The computing device may be provided with an operating system that allows the execution of software applications in order to manipulate data. A computing device such as server 602 and the user computer 604 can include one or more processors, memory, a removable media reader, network interface, display and interface, and one or more input devices, e.g., keyboard, keypad, mouse, etc. and input device interface, for example. One skilled in the art will recognize that server 602, and/or user computer 604, may be configured in many different ways, and/or that server 602 and/or user computer 604 may be implemented using many different combinations of hardware, software, or firmware.

In accordance with one or more embodiments, a computing device 602 can make a user interface available to a user computer 604 via the network 606. The user interface made available to the user computer 604 can include content items, such as content of a media event, short messages, etc. In accordance with one or more embodiments, computing device 602 makes a user interface available to a user computer 604 by communicating a definition of the user interface to the user computer 604 via the network 606. The user interface definition can be specified using any of a number of languages, including without limitation a markup language such as Hypertext Markup Language, scripts, applets and the like. The user interface definition can be processed by an application executing on the user computer 604, such as a browser application, to output the user interface on a display coupled, e.g., a display directly or indirectly connected, to the user computer 604. In accordance with one or more embodiments, user computer 604 uses an application, browser, short message client application In an embodiment the network 606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 6. Alternatively, embodiments of the present disclosure can be implemented other environments, e.g., a peer-to-peer environment as one non-limiting example.

Figure 7:
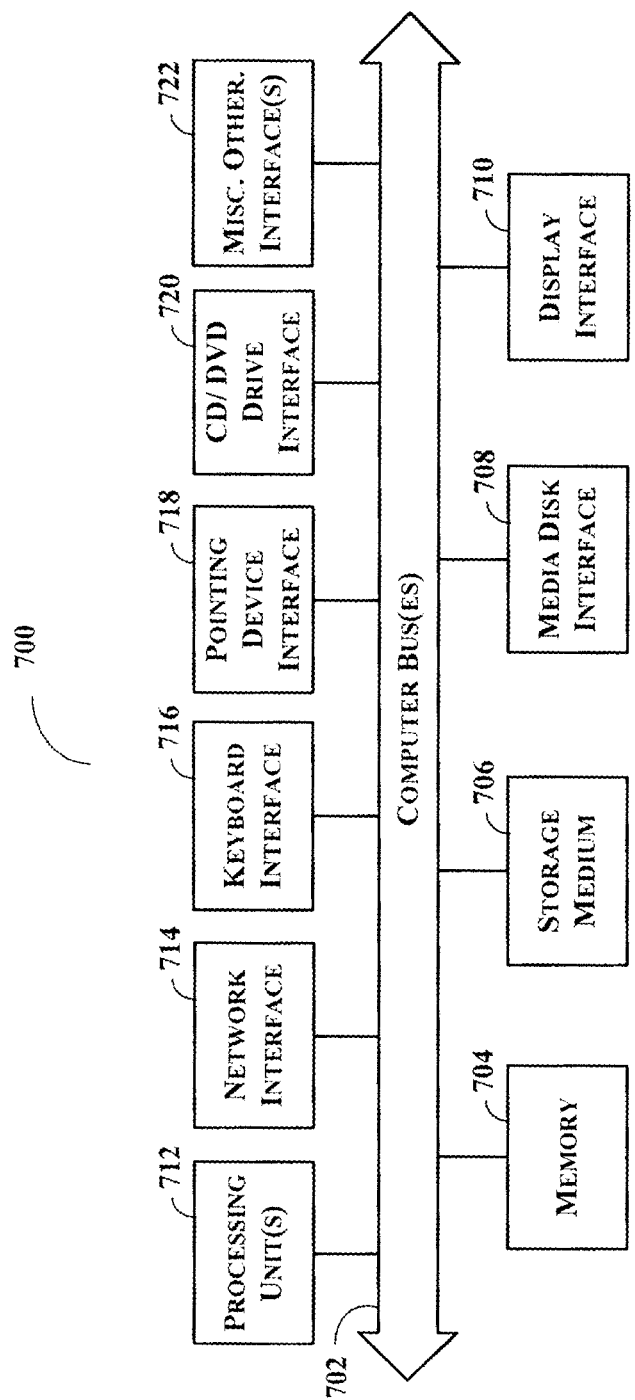
FIG. 7 is a detailed block diagram illustrating an internal architecture of a computing device, e.g., a computing device such as server 702 or user computer 704, in accordance with one or more embodiments of the present disclosure.

FIG. 7 is a detailed block diagram illustrating an internal architecture of a computing device, e.g., a computing device such as server 702 or user computer 704, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 708 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system, method and architecture have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   obtaining, using at least one computing device, a sampling of short messages with content posted by a plurality of users, by sampling a collection of short messages with content posted during a broadcast of a media event's content;
   identifying, using the at least one computing device and the sampling of short messages, a segment in the media event's content, identification of the segment comprising identifying an onset and an end of the identified segment in the media event's content using levels of short messaging activity detected using the sampling of short messages, the levels comprising a level used in identifying the onset and a different level used in identifying the end;
   identifying, using the at least one computing device, at least one term from the content of the sampling of short messages, the at least one term indicative of a context of the identified segment in the media event content; and
   annotating, using the at least one computing device, the media event's content using the at least one term identified from the content of the sampling of short messages.

2. The method of claim 1, the annotating the media event's content further comprising:
   annotating, using the at least one computing device, the segment identified in the media event's content using the at least one term identified from the content of the sampling of short messages.

3. The method of claim 1, further comprising:
   selecting, using the at least one computing device, the sampling of short messages from a collection of short messages, the selecting comprising selecting short messages from at least one user of the plurality of users, the at least one user being a followcaster having at least a threshold number of subscribers.

4. The method of claim 3, the identifying a segment in the media event further comprising:
   identifying, using the at least one computing device, the segment in the media event using short message activity of at least one user identified as a followcaster having at least a threshold number of subscribers.

5. The method of claim 1, further comprising:
   selecting, using the at least one computing device, the sampling of short messages from a collection of short messages, the selecting comprising selecting short messages of a conversational-type.

6. The method of claim 5, wherein the conversational-type message contains an indication that the message is directed to one or more users, the indication comprising an indicator linking the message sender and the one or more users.

7. The method of claim 1, the identifying a segment in the media event further comprising:
   identifying, using the at least one computing device, the segment in the media event using short messages identified as a conversational-type message.

8. The method of claim 1, the identifying a segment in the media event further comprising:
   determining, using the at least one computing device and the sampling of short messages, a plurality of term frequency scores for a term used in the sampling of short messages, each of the plurality of term frequency scores corresponding to a window of time of the media event and being indicative of a number of short messages containing the term in the corresponding window of time;
   determining, using the at least one computing device and the sampling of short messages, a plurality of normalized frequency scores corresponding to the plurality of term frequency scores, for each term frequency score, the corresponding normalized frequency score comprising a ratio of the term frequency score and a corpus term frequency, the corpus term frequency indicative of a number of short messages in the sampling containing the term;
   determining, using the at least one computing device and the plurality of normalized term frequency scores identified for the term, a maximum normalized term frequency score; and
   identifying, using the at least one computing device, the segment from the window of time corresponding to the determined maximum normalized frequency score for the term.

9. The method of claim 1, identifying at least one term taken from the sampling of short messages further comprising:
   determining, using the at least one computing device and the sampling of short messages, a plurality of term frequency scores for a term used in the sampling of short messages, each of the plurality of term frequency scores corresponding to a window of time of the media event and being indicative of a number of short messages containing the term in the corresponding window of time;

determining, using the at least one computing device and the plurality of term frequency scores identified for the term, whether the term's frequency of use is higher relatively at a time corresponding to the identified segment; and identifying, using the at least one computing device, the term as a term indicative of a context of the identified segment if the term's frequency of use is higher relatively at a time corresponding to the identified segment.

10. The method of claim 9, wherein each of the term frequency scores comprises a normalized frequency score, the normalized frequency score comprising a ratio of a term frequency indicative of a number of short messages containing the term for the window of time and a corpus term frequency indicative of a number of short messages in the sampling containing the term.

11. A non-transitory computer-readable storage medium tangibly encoded with computer-executable instructions that when executed by a processor associated with a computing device perform a method comprising:

obtaining a sampling of short messages with content posted by a plurality of users, by sampling a collection of short messages with content posted during a broadcast of a media event's content;

identifying, using the sampling of short messages, a segment in the media event's content, identification of the segment comprising identifying an onset and an end of the identified segment in the media event's content using levels of short messaging activity detected using the sampling of short messages, the levels comprising a level used in identifying the onset and a different level used in identifying the end;

identifying at least one term taken from the content of the sampling of short messages, the at least one term indicative of a context of the identified segment in the media event content; and annotating the media event's content using the at least one term identified from the content of the sampling of short messages.

12. The non-transitory computer-readable storage medium of claim 11, annotating the media event's content further comprising:

annotating the segment identified in the media event's content using the at least one term identified from the content of the sampling of short messages.

13. The non-transitory computer-readable storage medium of claim 11, further comprising:

selecting the sampling of short messages from a collection of short messages, the selecting comprising selecting short messages from at least one user of the plurality of users, the at least one user being a followcaster having at least a threshold number of subscribers.

14. The non-transitory computer-readable storage medium of claim 13, identifying a segment in the media event further comprising:

identifying the segment in the media event using short message activity of at least one user identified as a followcaster having at least a threshold number of subscribers.

15. The non-transitory computer-readable storage medium of claim 11, further comprising:

selecting the sampling of short messages from a collection of short messages, the selecting comprising selecting short messages of a conversational-type.

16. The non-transitory computer-readable storage medium of claim 11, identifying a segment in the media event further comprising:

identifying the segment in the media event using short messages identified as a conversational-type message.

17. The non-transitory computer-readable storage medium of claim 11, identifying a segment in the media event further comprising:

determining, using the sampling of short messages, a plurality of term frequency scores for a term used in the sampling of short messages, each of the plurality of term frequency scores corresponding to a window of time of the media event and being indicative of a number of short messages containing the term in the corresponding window of time;

determining, using the sampling of short messages, a plurality of normalized frequency scores corresponding to the plurality of term frequency scores, for each term frequency score, the corresponding normalized frequency score comprising a ratio of the term frequency score and a corpus term frequency, the corpus term frequency indicative of a number of short messages in the sampling containing the term;

determining, using the plurality of normalized term frequency scores identified for the term, a maximum normalized term frequency score; and identifying the segment from the window of time corresponding to the determined maximum normalized frequency score for the term.

18. The non-transitory computer-readable storage medium of claim 11, identifying at least one term taken from the sampling of short messages further comprising:

determining, using the sampling of short messages, a plurality of term frequency scores for a term used in the sampling of short messages, each of the plurality of term frequency scores corresponding to a window of time of the media event and being indicative of a number of short messages containing the term in the corresponding window of time;

determining, using the plurality of term frequency scores identified for the term, whether the term's frequency of use is higher relatively at a time corresponding to the identified segment; and identifying the term as a term indicative of a context of the identified segment if the term's frequency of use is higher relatively at a time corresponding to the identified segment.

19. The non-transitory computer-readable storage medium of claim 18, wherein each of the term frequency scores comprises a normalized frequency score, the normalized frequency score comprising a ratio of a term frequency indicative of a number of short messages containing the term for the window of time and a corpus term frequency indicative of a number of short messages in the sampling containing the term.

20. A computing device comprising:

a non-transitory storage medium for tangibly storing thereon program logic for execution by the processor, the program logic comprising:

obtaining logic executed by the processor for obtaining a sampling of short messages with content posted by a plurality of users, the sampling of short messages comprising a collection of short messages with content posted during a broadcast of a media event's content;

identifying logic executed by the processor for identifying, using the sampling of short messages, a segment in the media event's content, identification of the segment comprising identifying an onset and an end of the identified segment in the media event's content using levels of short messaging activity detected using the sampling of short messages, the levels comprising a level used in identifying the onset and a different level used in identifying the end;

identifying logic executed by the processor for identifying at least one term from the content of the sampling of short messages, the at least one term indicative of a context of the identified segment in the media event content; and annotating logic executed by the processor for annotating the media event's content using the at least one term identified from the content of the sampling of short messages.

\* \* \* \* \*